(12) United States Patent
Misono

(10) Patent No.: US 9,248,791 B2
(45) Date of Patent: Feb. 2, 2016

(54) IN-VEHICLE BATTERY CHARGING SYSTEM

(75) Inventor: Yoshimasa Misono, Takanezawa-machi (JP)

(73) Assignee: HONDA ACCESS CORP., Saitama (JP)

( * ) Notice: Subject to any disclaimer, the term of this patent is extended or adjusted under 35 U.S.C. 154(b) by 583 days.

(21) Appl. No.: 13/606,939

(22) Filed: Sep. 7, 2012

(65) Prior Publication Data

US 2013/0147426 A1   Jun. 13, 2013

(30) Foreign Application Priority Data

Dec. 8, 2011   (JP) .................................. 2011-268908

(51) Int. Cl.
*H02J 7/00* (2006.01)
*B60R 16/03* (2006.01)

(52) U.S. Cl.
CPC ...................................... *B60R 16/03* (2013.01)

(58) Field of Classification Search
CPC ........... H02J 7/025; H02J 5/005; H02J 17/00; H02J 7/0047; H02J 7/0044; H02J 7/0045; H04B 5/0081
USPC .................................................. 320/113, 115
See application file for complete search history.

(56) References Cited

U.S. PATENT DOCUMENTS

| 8,816,636 | B2 * | 8/2014 | Shinde et al. | 320/108 |
| 8,861,636 | B2 * | 10/2014 | Sun et al. | 375/279 |
| 2010/0264871 | A1 * | 10/2010 | Matouka et al. | 320/108 |
| 2012/0153894 | A1 * | 6/2012 | Widmer | H04B 5/0037 320/108 |

FOREIGN PATENT DOCUMENTS

| JP | 2000-139033 A | 5/2000 |
| JP | 2006-94699 A | 4/2006 |
| JP | 2008-301554 A | 12/2008 |
| JP | 2010-136594 A | 6/2010 |
| JP | 2011-234514 A | 11/2011 |
| WO | 2011/090620 A3 | 7/2011 |

OTHER PUBLICATIONS

Japanese Office Action dated Jun. 25, 2013, issued in corresponding Japanese Patent Application No. 2011-268908, with Partial English translation (4 pages).

* cited by examiner

*Primary Examiner* — Nghia Doan

(74) *Attorney, Agent, or Firm* — Westerman, Hattori, Daniels & Adrian, LLP

(57) ABSTRACT

An in-vehicle battery charging system adaptable to a wide variety of objects to be charged. A charging system 1 includes a battery charger 3 with a built-in primary coil 2 used to charge an object 7 with a secondary coil 5 and a rechargeable battery 6. By allowing the battery charger 3 and the object 7 to come close to each other, the rechargeable battery 6 is charged through an electromagnetic inductive action between the coils. The battery charger 3, provided in a vehicle instrumental panel 4, includes a slider assembly 23 for adjusting a position of the secondary coil 5 of the object 7 with respect to the primary coil 2 of the battery charger 3. This slider assembly 23 enables a positional relationship between the coils to be properly adjusted, enabling a proper charge condition to be maintained for a variety of objects to be charged.

9 Claims, 9 Drawing Sheets

IN-VEHICLE BATTERY CHARGING SYSTEM

BACKGROUND OF THE INVENTION

1. Field of the Invention

The present invention relates to an in-vehicle battery charging system used to charge an object to be charged that includes an energy receiving unit and a rechargeable battery.

2. Description of the Related Art

Heretofore, as this sort of contactless charging system, there has been disclosed a battery charging system comprising: a battery charger with a built-in primary coil; and an object to be charged including a secondary coil and a rechargeable battery, in which the battery charger and the object to be charged are allowed to come close to each other to charge the rechargeable battery through an electromagnetic inductive action between both the coils. This battery charging system includes a holding unit for performing at least two-stage adjustment of a battery charging distance between the battery charger and the object to be charged, and thus due to its ability to adjust a charging current to a specific value and then to feed the same, only one battery charger of this type suffices to charge even a plurality of objects to be charged that are different in charging current, as disclosed in, e.g., Japanese unexamined patent application publication No. 2000-139033.

According to the foregoing battery charging system, however, in order to let a stick-like holder hold the object to be charged, the object needs to be provided with a portion to engage with the holder. Further, the publication No. 2000-139033 also discloses that a support portion is provided on a battery charger placing surface in a manner extending obliquely upwards, while this placing surface is partly formed with a tilted surface arranged orthogonal to an inclined face of the support portion, whereby when the object to be charged is placed on the tilted surface so as to be inclined along the support portion, the object to be charged is held inclined to thereby widen a battery charging distance, thereby effecting a low-rate charge, whereas when vertically placed, the object to be charged and the battery charger get close to each other to narrow the battery charging distance, thereby effecting a quick charge. This charging system, however, is not suitable for in-vehicle use, as it is difficult to charge the object with the object being vertically placed in a moving vehicle.

Further, as another charging system for simplifying an efficient charge, there has been proposed an inductive charging pad with a placement indicator, as disclosed in e.g., Japanese unexamined patent application publication No. 2006-94699. In the publication No. 2006-94699, it is proposed that a graphic representation of an electric device is disposed on a charging surface of a battery charger to indicate a position of a primary coil disposed within a boundary of the graphic representation. When the electric device is placed on the graphic representation, the electric device is aligned with the graphic representation, and thus the primary coil of the battery charger becomes aligned with a secondary coil of the electric device, whereby positioning the electric device within the boundary of the graphic representation facilitates efficient inductive power transfer. According to this technique, however, if the electric device itself is changed or replaced with that of another type, the graphic representation also needs to be changed accordingly, thus leading to inconvenience.

On the other hand, there has been proposed yet another contactless battery charging system, as disclosed in e.g., Japanese unexamined patent application publication No. 2008-301554. According to this battery charging system, communication with a device to be charged placed on a placing portion enables information on the device to be charged to be imported, and then based on the information thus imported, a placing position (an outer frame) of the device to be charged and a position of a primary transmission coil are displayed on a liquid crystal display section provided on the placing portion to thereby guide the device to be charged to a precise position on the placing portion, thus enabling the device to be charged to be easily placed thereon. According to this contactless charging system, information about placing position specific to respective specific devices to be charged is retrieved from a database so that a display means is controlled in such a way that the placing position of the device to be charged is displayed based on the placing position information thus retrieved. In this manner, this contactless charging system can be adapted to a plurality of devices, yet there remains a problem that it cannot be used for devices not registered in the database.

SUMMARY OF THE INVENTION

To solve the problems described above, it is, therefore, an object of the present invention to provide an in-vehicle battery charging system which is suitable for an in-vehicle system, realizing a proper charge condition for a variety of objects to be charged.

To attain the above object, a first aspect of the present invention is an in-vehicle battery charging system comprising a battery charger with an energy transmitting unit to be used to charge an object to be charged including an energy receiving unit and a rechargeable battery, and thus, the battery charger and the object to be charged are allowed to come close to each other, thus charging the rechargeable battery using energy received by the energy receiving unit from the energy transmitting unit. The battery charger is provided in an instrumental panel of a vehicle and includes a holding unit for adjusting a position of the energy receiving unit of the object to be charged with respect to the energy transmitting unit of the battery charger.

Further, a second aspect of the present invention is an in-vehicle battery charging system in which the battery charger includes a mounting surface for mounting the object to be charged thereon and the mounting surface is tilted forward in a travelling direction of a vehicle, and the holding unit is provided on the mounting surface in a vertically adjustable manner.

Furthermore, a third aspect of the present invention is an in-vehicle battery charging system in which a recess is formed in an upper portion of the mounting surface and is made large enough for an upper portion of the object to be charged to get thereinto.

According to the in-vehicle battery charging system of the first aspect of the present invention, a positional relationship between the energy transmitting unit of the battery charger and the energy receiving unit of the object to be charged can be properly adjusted and therefore a proper charge condition can be maintained for a variety of object to be charged s.

According to the in-vehicle battery charging system of the second aspect of the present invention, the mounting surface of the battery charger is formed in a forward-tilting manner with respect to the travelling direction of the vehicle and therefore a charging function can be maintained.

According to the in-vehicle battery charging system of the third aspect of the present invention, the object to be charged is moved from the battery charger to the recess and thus the object to be charged can be easily taken out.

BRIEF DESCRIPTION OF THE DRAWINGS

FIG. 8 is an explanatory drawing showing a relationship between the object to be charged and the mounting surface, in which

DETAILED DESCRIPTION OF THE PRESENT INVENTION

Figure 1:
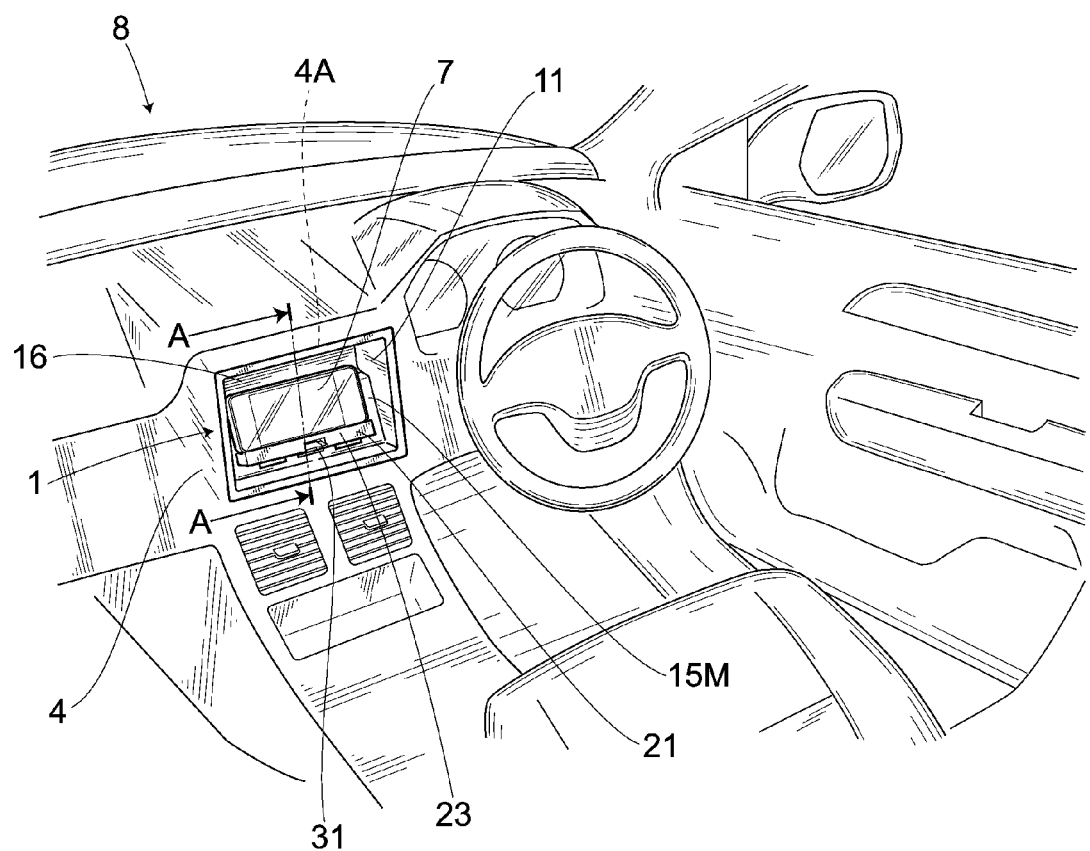
FIG. 1 is an overall perspective view illustrating an in-vehicle battery charging system according to a first embodiment of the present invention.

Hereunder is a description of embodiments of an in-vehicle battery charging system according to the present invention with reference to the accompanying drawings.
First Embodiment FIG. 1 to FIG. 8 show a first embodiment of the present invention. As shown in the drawings, the in-vehicle battery charging system 1 includes a battery charger 3 with a built-in primary coil 2 acting as an energy transmitting unit. The battery charger 3 is housed in an instrumental panel 4 of a vehicle 8 to be used to contactlessly charge an object 7 to be charged including a secondary coil 5 acting as an energy receiving unit and a rechargeable battery 6. Here, the object 7 to be charged is a mobile terminal with a wireless function, and examples of such mobile terminal may include mobile electronic devices which enable information communication, as represented by a cellular phone, a smart phone, and an UMPC (Ultra Mobile Personal Computer).

Figure 2:
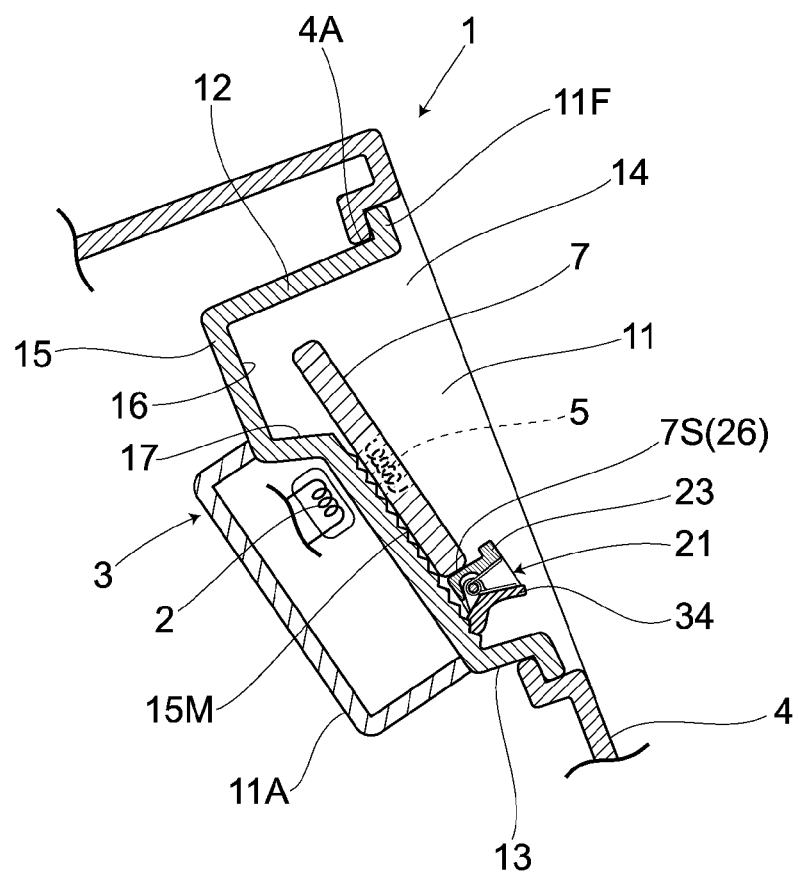
FIG. 2 is a cross-sectional view on A-A line in FIG. 1, illustrating the first embodiment of the present invention.
Figure 3:
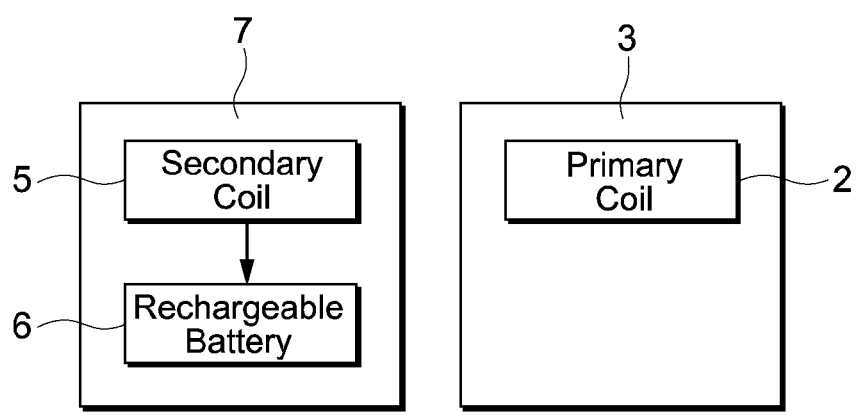
FIG. 3 is a block diagram of a battery charger and an object to be charged, illustrating the first embodiment of the present invention.
Figure 4:
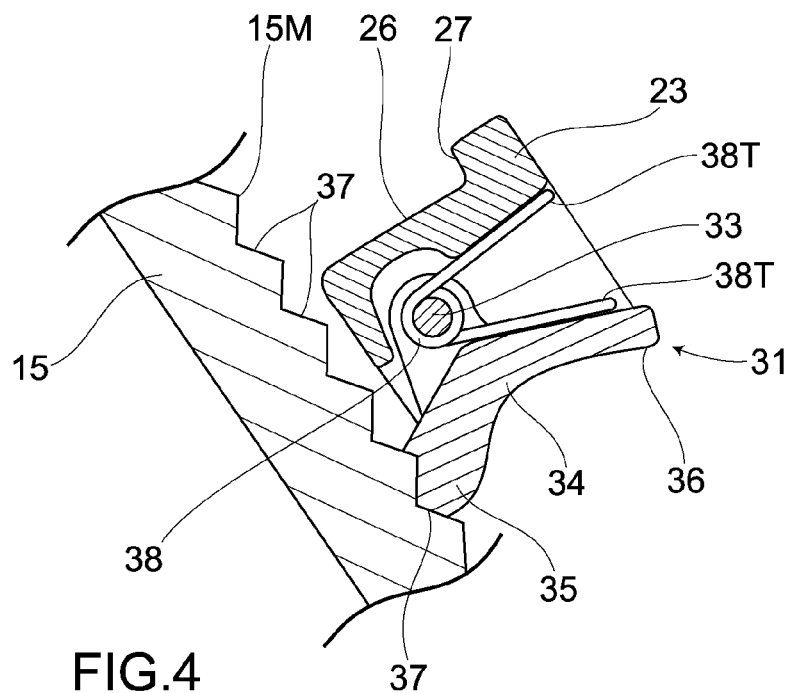
FIG. 4 is an enlarged cross-sectional view of an operative unit illustrating the first embodiment of the present invention.

As shown in FIGS. 1 and 2, the battery charger 3 of the in-vehicle battery charging system 1 is mounted in the following manner, with the structure described hereinbelow: a housing portion 11 in which the object 7 to be charged can be housed is provided in the central portion of the instrumental panel 4 of the vehicle 8; the housing portion 11 includes an open front surface (acting as a rear surface in terms of a travelling direction of the vehicle), upper and lower surfaces 12, 13 arranged approximately parallel to each other, right and left surfaces 14, 14 arranged approximately parallel to each other, and a rear surface 15 for closing rear ends of these upper and lower surfaces 12, 13 and right and left surfaces 14,14; a recess 16 is formed in an upper portion of the rear surface 15; a front surface of the rear surface 15 in a lower portion of the recess 16 acts as a mounting surface 15M, which is tilted forward in the travelling direction of the vehicle; and then the object 7 to be charged is mounted on the mounting surface 15M with its rear surface, being transversely situated, in contact with the mounting surface 15M. Further, a shoulder 17 is formed between the mounting surface 15M and the recess 16. The recess 16 is made large enough for an upper portion of the object 7 to be charged to be accommodated thereinto. The housing portion 11 is made up of the upper and lower surfaces 12, 13, the right and left surfaces 14, 14, and the rear surface 15 that are integrated together to be formed into a boxy shape. The housing portion 11 makes up an outer casing or contour of the battery charger 3 and is mounted so as to cover an opening 4A provided in the instrumental panel 4. In this case, a rim 11F is circumferentially provided in the front surface of the housing portion 11, such that with the rim 11F being abutted against a peripheral portion of the opening 4A, the housing portion 11 is mounted on the instrumental panel 4. In the meantime, outside the housing portion 11, there are incorporated the primary coil 2 and electronic components (not shown) for charge control so that they are housed between an inner casing 11A and the housing portion 11. Here, the battery charger 3 is fed by an in-vehicle electric source.

The primary coil 2 is provided in a lower portion of the shoulder 17 and is continuously provided over a substantially entire length of the mounting portion 15M in the traverse direction thereof. Accordingly, when positioning the primary and secondary coils 2, 5, it suffices if the position of the secondary coil 5 of the object 7 to be charged is matched vertically to the position of the primary coil 2, eliminating the need of positioning in the traverse direction of the object 7 to be charged.

Figure 5:
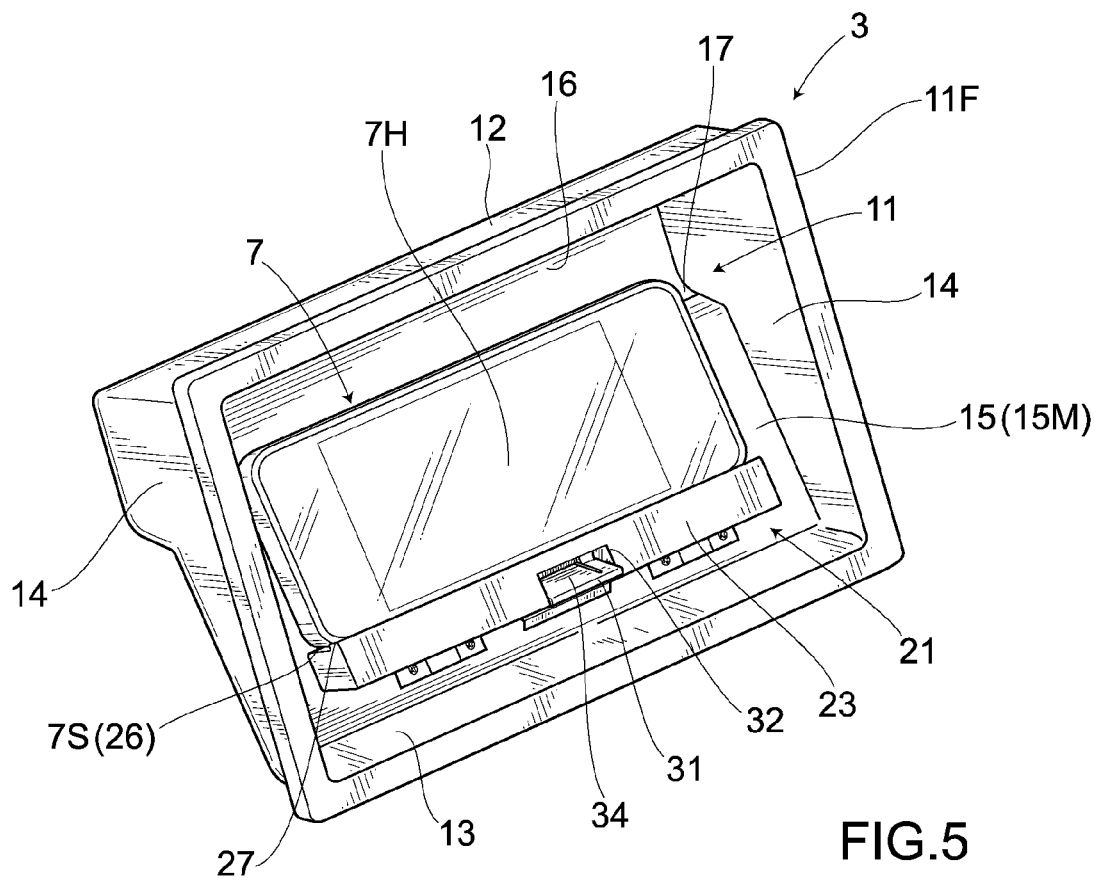
FIG. 5 is a perspective view of the in-vehicle battery charging system in a state where the object to be charged is mounted, illustrating the first embodiment of the present invention.
Figure 6:
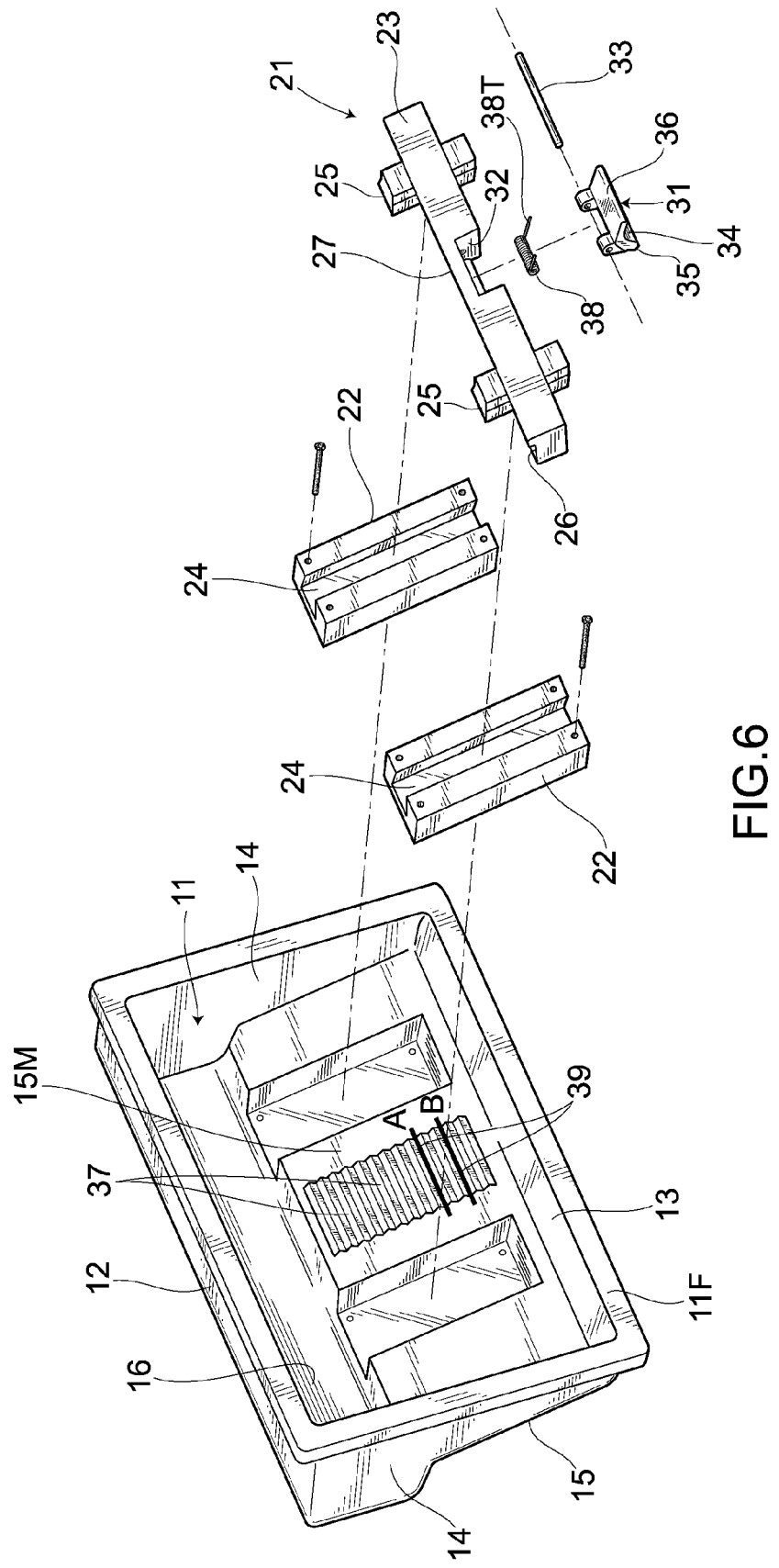
FIG. 6 is an exploded perspective view of a main part thereof, illustrating the first embodiment of the present invention.
Figure 7:
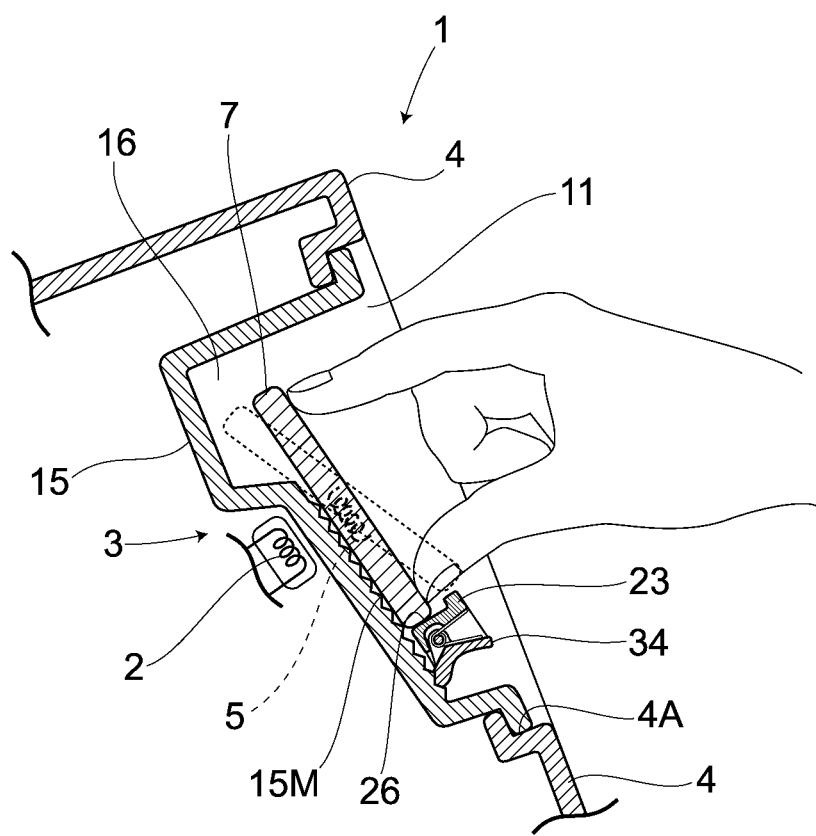
FIG. 7 is a cross-sectional view thereof, explaining how to remove the object to be charged, illustrating the first embodiment of the present invention.

As shown in FIGS. 5 and 6, the in-vehicle battery charging system 1 includes a position adjusting unit 21 for adjusting a vertical position 21 of the object 7 to be charged inside the housing portion 11. This position adjusting unit 21 includes a pair of rails 22, 22 provided at the right and left sides on the mounting surface 15M and a slider assembly 23 vertically movable along the rails 22, 22. The rail 22 includes a guide groove 24 that is dovetail-shaped. A sliding unit 25 that is protruded is provided on right and left sides of the slider assembly 23. Then, by the slider unit 25 sliding along the guide groove 24, a vertical position of the slider assembly 23 can be adjusted. A carrying surface 26 for carrying and supporting a lateral portion 7S of the object 7 to be charged is provided on an upper surface of the slider assembly 23. On the front side of the carrying surface 26, there is provided a front step portion 27 acting as a restricting portion for restricting the lateral portion 7S from moving to the front side.

Also, the position adjusting unit 21 is provided with an operative unit 31 for fixing and unfixing the position of the slider assembly 23. For this operative unit 31, a recess 32 is provided in the central and lower portion of the slider assembly 23, while an operative body 34 is provided in the recess 32 in a manner rotatable around a transverse shaft 33. A groove catching portion 35 is provided on a first side of the operative unit 34, while an operative portion 36 is provided on a second side of the operative unit 34. On the other hand, the mounting surface 15M is formed with a plurality of locking grooves 37 that are provided vertically in a stepwise manner at a given interval so that the groove catching portion 35 is locked thereon. Further, the operative unit 31 includes a biasing unit for rotatably biasing the operative body 34 in such a direction as to lock the groove catching portion 35 to the locking groove 37. As this biasing unit, a coil spring 38 is employed in the present embodiment. This coil spring 38 is put on the shaft 33 and is arranged between the slider assembly 23 and the operative portion 36 with a distance between ends 38T, 38T of the coil spring 38 being narrowed such that the groove catching portion 35 is biased toward such a direction as to be locked to the locking groove 37 by a resilient restoration action of the coil spring 38.

A plurality of scale marks 39 corresponding to possible types of the object 7 to be charged are provided in the locking grooves 37. By laying any portion of the position adjusting unit 21 including the groove catching portion 35 and the carrying surface 26 upon one of the scale marks 39, the slider assembly 23 can be positioned corresponding to a specific type of the object 7 to be charged.

Then, a user may narrow a distance between the operative portion 36 and the front step portion 27 against the biasing force of the coil spring 38 to release the lock between the groove catching portion 35 and the locking groove 37, thereby allowing the slider assembly 23 to become vertically movable. As a result, the user may vertically move the slider assembly 23 to a position suitable for the specific object 7 to be charged that is actually used, i.e., a position where the primary coil 2 of the battery charger 3 and the secondary coil 5 of the object 7 to be charged are positioned with each other, and then the user may allow the groove catching portion 35 to be locked again to the locking groove 37 to fix the slider assembly 23 to the position. In the case that substantially no gap exists between the upper portion of the object 7 to be charged mounted and the upper surface 12, the user may push the upper portion of the object 7 to be charged toward the recess 16, thus allowing the lower portion of the object 7 to be charged to move away from the mounting surface 15M, enabling the object 7 to be charged to be taken out.

Figure 8A:
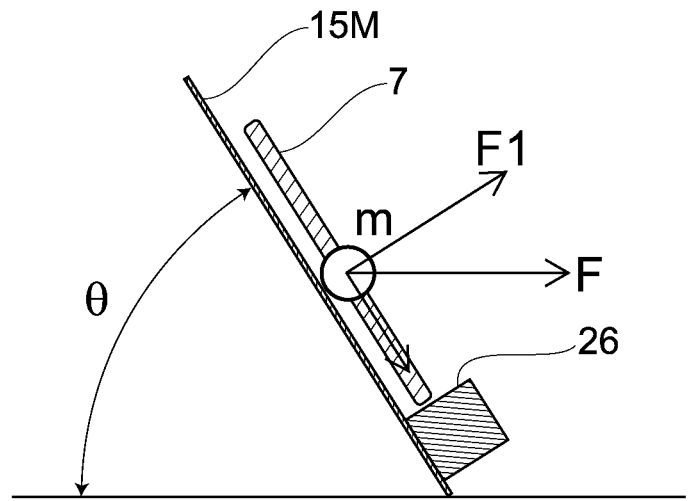
FIG. 8(A) illustrates a force generated at the start of a vehicle, while FIG. 8(B) a force caused by own weight of the object to be charged, illustrating the first embodiment of the present invention.
Figure 8B:
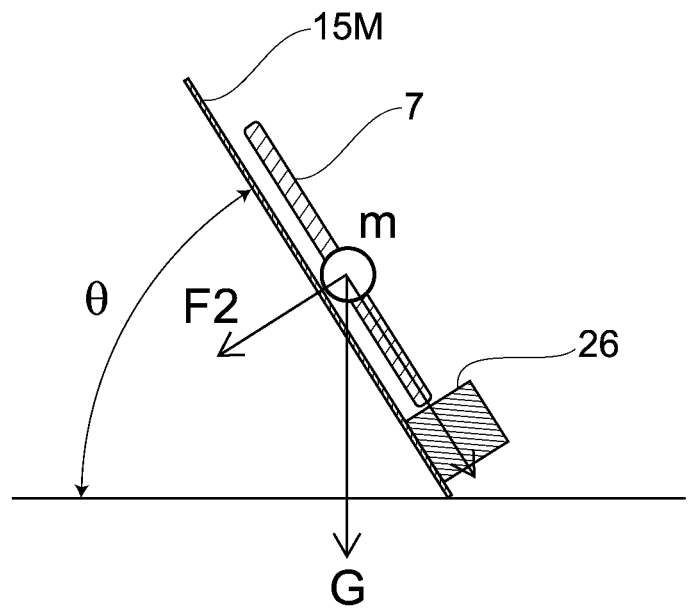

Next is a description of what is a preferable angle of the mounting surface 15M. As shown in FIG. 8(A), a backward force F applied to the object 7 to be charged housed in the housing portion 11 at the time of a sudden start of the vehicle 8 is expressed by the following Formula 1, wherein the force F applied backward at the sudden start can be obtained by multiplying the gravitational acceleration g by a mass m and a coefficient 0.3.

$$F = m \cdot 0.3g \quad \text{Formula 1}$$

where m means a mass of the object 7 to be charged, and g means the gravitational acceleration.

Further, a vertical force G generated by the weight of the object 7 to be charged is expressed by the following Formula 2:

$$G = m \cdot g \quad \text{Formula 2}$$

A condition for the object 7 to be charged mounted on the mounting surface 15M not to turn over backward even if the vehicle 8 suddenly starts is expressed by the following Formula 3:

$$F2 \geq F1 \quad \text{Formula 3}$$

where, as shown in FIGS. 8(A) and (B), F1 means a force applied to the center of gravity of the object 7 to be charged with the lateral portion 7S defined as a center, and F2 means a force opposite to the force F1, caused by the weight of the object 7 to be charged.

Here, when an angle of the mounting surface 15M relative to a horizontal direction is defined as θ, then F1=0.3mg·sinθ and F2=mg·cosθ, and then substituting this relationship into the Formula 3 to obtain the following Formula 4:

$$0.3mg \cdot \sin\theta \leq mg \cdot \cos\theta \quad \text{Formula 4}$$

Then $$\sin\theta / \cos\theta \leq 3.3 \quad \text{Formula 5}$$

is obtained, and therefore $$\tan\theta \leq 3.3 \quad \text{Formula 6}$$

From this Formula 6, θ is determined as an angle equal to or less than 73 degrees.

Accordingly, by keeping the angle θ of the mounting surface 15M tilted in the travelling direction relative to a horizontal level at the time of the travel of a vehicle at 73 degrees or less, the object 7 to be charged can be prevented from turning over at the start of the vehicle. Further, in terms of the visibility of the display section 7H, it is desirable that the angle θ be not less than 45 degrees and not more than 73 degrees.

As described above, according to the present embodiment, there is provided the in-vehicle battery charging system 1 comprising the battery charger 3 with the primary coil 2 acting as the energy transmitting unit to be used to charge the object 7 to be charged including the secondary coil 5 acting as the energy receiving unit and the rechargeable battery 6. Accordingly, the battery charger 3 and the object 7 to be charged are allowed to come close to each other, thus charging the rechargeable battery 6, using the energy received by the energy receiving unit from the energy transmitting unit, i.e., the energy received by the secondary coil 5 through the electromagnetic inductive action between both the coils 2, 5. According to the in-vehicle battery charging system 1, the battery charger 3 is provided in the instrumental panel 4 of the vehicle 8 and includes the slider assembly 23 acting as a holding unit for adjusting the position of the secondary coil 5 of the object 7 to be charged with respect to the position of the primary coil 2 of the battery charger 3. Hence, the relationship between the primary coil 2 of the battery charger 3 and the secondary coil 5 of the object 7 to be charged is properly adjustable and therefore a proper charge condition can be maintained for a variety of objects to be charged.

Further, according to the present embodiment, as described above, the battery charger 3 includes the mounting surface 15M on which the object 7 to be charged is mounted and this mounting surface 15M is tilted forward in the travelling direction of the vehicle 8 and the slider assembly 23 acting as a holding unit is provided on the mounting surface 15M in a vertically adjustable manner. Hence, the mounting surface 15M of the battery charger 3 is formed in such a manner as to tilt forward in the travelling direction of the vehicle 8, thereby enabling a charging function to be maintained.

Furthermore, according to the present embodiment, as described above, the recess 16 is formed in the upper portion of the mounting surface 15M and the recess 16 is made large enough for the upper portion of the object 7 to be charged to be put thereinto. Hence, by moving the object 7 to be charged up to the recess 16, the object 7 to be charged can be readily taken out.

Moreover, according to the present embodiment, the housing portion 11 for housing and placing the object 7 to be charged is provided in the central portion of the instrumental panel 4 of the vehicle 8 and therefore a charging operation can be easily performed. Besides, the position adjusting unit 21 includes the operative unit 31 capable of fixing and unfixing the vertical position of the slider assembly 23 to thereby enable the position of the slider assembly 23 to be easily adjusted using the operative unit 31. Further, the battery charger 3 is built in the housing position 11 of a box shape, and therefore by mounting the housing portion 11 in the instrumental panel 4 of the vehicle 8 and connecting the battery charger 3 electrically with a vehicle electric source, the battery charger 3 can be simply mounted on the vehicle 8. Furthermore, the mounting surface 15M is tilted forward at an angle not more than 73 degrees and therefore the object 7 to be charged does not turn over rearward during the normal travelling of the vehicle. Moreover, the lower portion of the object 7 to be charged can be restricted from moving by the front step portion 27.

Besides, by operating the front step portion 27 and the operative portion 36 at the time of using the operative unit 31, the object 7 to be charged can be prevented from being unintentionally contacted. Further, using the groove catching portion 35 acting as one uneven fitting portion and the locking groove 37 acting as the other uneven fitting portion, the position of the slider assembly 23 can be simply adjusted.

Second Embodiment

Figure 9:
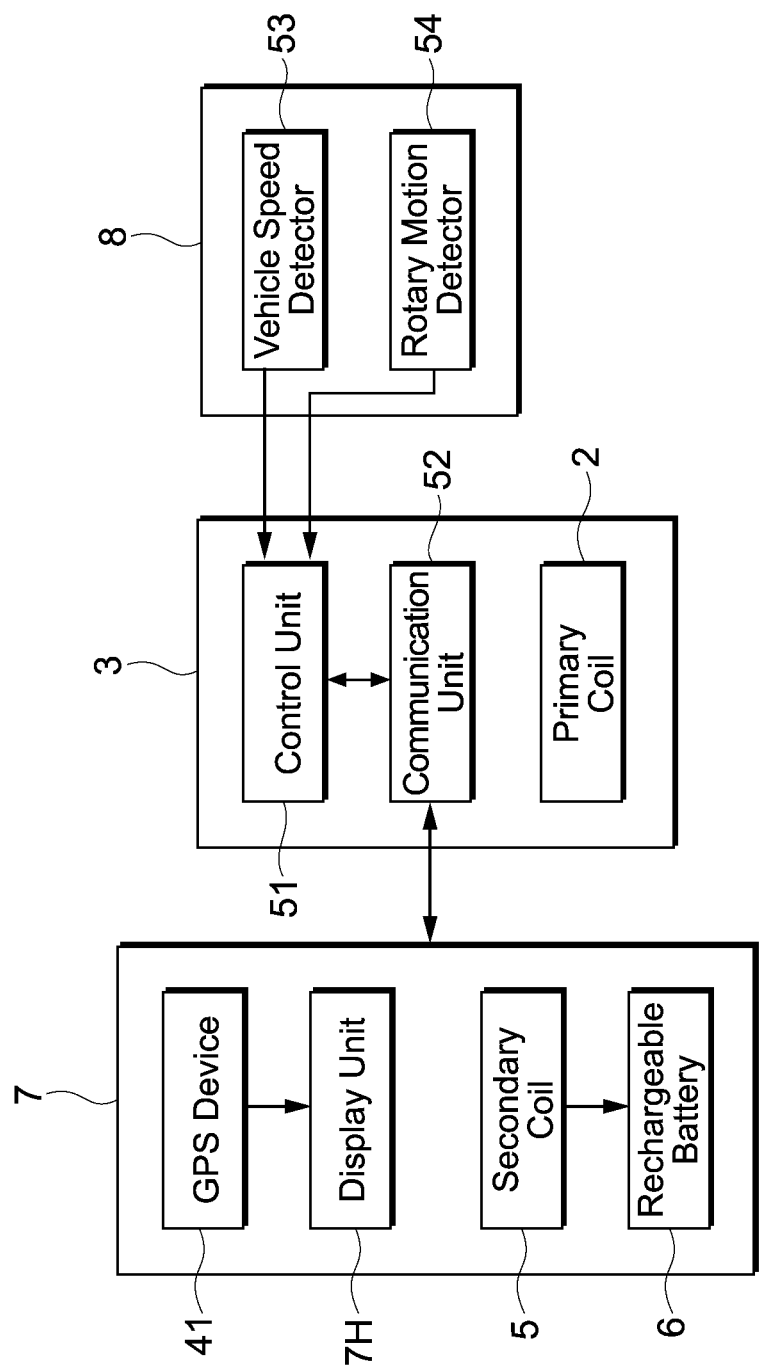
FIG. 9 is a block diagram illustrating a second embodiment of the present invention.

FIG. 9 shows a second embodiment. The same symbols are attached to parts the same as those in the first embodiment and the detailed description thereof is omitted, while a feature specific to the second embodiment is described in detail hereinbelow. The object 7 to be charged in the present embodiment is a mobile terminal with a wireless function and an information display function, having a built-in GPS device 41. The object 7 to be charged displays, on a display section 7H thereof, positional information containing positioning results obtained by the GPS device 41, and travelling conditions such as a vehicle speed and the like together with map information. In this case, the object 7 to be charged is placed on the mounting surface 15M with the display section 7H thereof surfaced on a driver or passenger side.

Further, the battery charger 3 of the in-vehicle battery charging system 1 is provided with a control unit 51 and a communication unit 52. This communication unit 52 transmits and receives data bi-directionally and wirelessly between itself and the object 7 to be charged, based on the communication standard of Bluetooth (registered trademark), for example. Meanwhile, the control unit 51 and the communication unit 52 are built in a housing space between the housing portion 11 and the inner casing 11A.

The control unit 51 transmits to the object 7 to be charged information collected from various travelling condition acquiring sensors mounted on the vehicle 8, including a vehicle speed sensor 53 acting as a vehicle speed detector for detecting a travelling speed of the vehicle 8 and a gyro sensor 54 acting as a rotary motion detector for detecting a rotary motion in a travelling direction of the vehicle 8.

The control unit 51 is allowed to perform control so as to transmit information on a vehicle speed obtained by the vehicle speed sensor 53 and a vehicle travelling direction obtained by the gyro sensor 54. Upon receiving actual measured data on the vehicle speed and travelling direction, the object 7 to be charged is allowed to correct the positional information including the positioning results obtained by the GPS device 41 and the vehicle speed, based on these actual measured data.

According to the present embodiment, the object 7 to be charged is a mobile information display terminal equipped with the GPS device 41, while the in-vehicle battery charging system 1 is equipped with the communication unit 52 for transmitting to the object 7 to be charged the information collected from the travelling information obtaining sensors mounted on the vehicle 8. Hence, there is an advantageous effect specific to the present embodiment such that when the vehicle 8 passes through a tunnel no electric waves emitted from a GPS satellite can reach, yet the positional information including the positioning results obtained by the GPS device 41 and the vehicle speed are corrected based on the actual measured data obtained by the vehicle speed sensor 53 and the gyro sensor 54 acting as the travelling condition acquiring sensors, and thus a precise vehicle travelling condition can be displayed on the object 7 to be charged, thus improving the precision of navigation by the object 7 to be charged such as a mobile information display terminal. Accordingly, the object 7 to be charged can be used for vehicle navigation and hence a vehicle navigation system equipped with a GPS device need not be provided, thus enhancing the convenience in using the object 7 to be charged with the GPS device 41.

Further, since the housing portion 11 for housing and placing the object 7 to be charged is provided in the central portion of the instrumental panel 4 of the vehicle 8, the information obtained by the GPS device 41 can be displayed by the object 7 to be charged at a position easily viewable by passengers.

Third Embodiment

Figure 10:
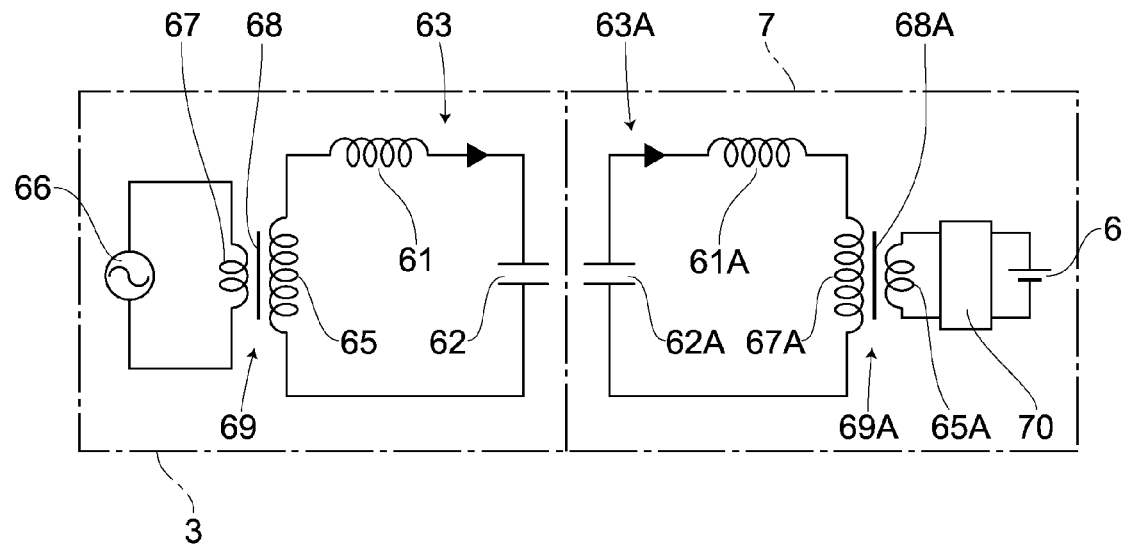
FIG. 10 is an explanatory drawing illustrating a third embodiment of the present invention.

FIG. 10 shows a third embodiment of the present invention. The same symbols are attached to parts the same as those in each of the above embodiments and the detailed description thereof is omitted, while a feature specific to the third embodiment is described in detail hereinbelow. In the third embodiment, there is provided an in-vehicle battery charging system 1 for charging a battery through an electric field coupling system. As shown in FIG. 10, the battery charger 3 comprises an electric power transmitting resonant circuit 63 including an inductive element 61 and a capacitive element 62 acting as an energy transmitting unit, while the object 7 to be charged comprises an electric power receiving resonant circuit 63A including an inductive element 61A and a capacitive element 62A acting as an energy receiving unit. Here, the capacitive element 62 is arranged at a position of the primary coil 2.

Further, the electric power transmitting resonant circuit 63 is provided with a secondary coil 65, while an alternate current source 66 is provided with a primary coil 67. An iron core 68 is provided between the secondary coil 65 and the primary coil 67 to form a transformer 69. At the same time, the electric power receiving resonant circuit 63A is provided with a primary coil 67A, while a rechargeable battery 6 is provided with a secondary coil 65A. Another iron core 68A is provided between the primary coil 67A and the secondary coil 65A to form a transformer 69A. A rectifying circuit 70 is provided between the secondary coil 65A and the rechargeable battery 6. Then, an electric power of the alternate current source 66 is fed to the electric power transmitting resonant circuit 63 via the transformer 69. An electric power from the battery charger 3 is fed to the electric power receiving resonant circuit 63A through the electric field coupling system between capacitive elements 62, 62A. The electric power thus fed is converted into a direct current power through the rectifying circuit 70 so that the direct current power is fed to the rechargeable battery 6. In the meantime, the electric power of an in-vehicle rechargeable battery may be converted into an alternate current by an AC converting unit so as to be used as the alternate current source 66.

As described above, according to the present embodiment, there is provided the in-vehicle charging system 1 comprising the battery charger 3 with the capacitive element 62 acting as an energy transmitting unit to be used to charge the object 7 to be charged including the capacitive element 62A acting as the energy receiving unit and the rechargeable battery 6. Then, the battery charger 3 and the object 7 to be charged are allowed to come close to each other, thus charging the rechargeable battery 6, using the energy received by the capacitive element 62A from the capacitive element 62, i.e., the energy received by the capacitive element 62A through the electric field coupling system between both the capacitive elements 62, 62A. According to the in-vehicle battery charging system 1, the battery charger 3 is provided in the instrumental panel 4 of the vehicle 8 and includes the slider assembly 23 acting as a holding unit for adjusting the position of the capacitive element 62A of the object 7 to be charged with respect to the capacitive element 62 of the battery charger 3. Hence, the in-vehicle battery charging system 1 according to the third embodiment achieves the same advantageous operation and effect as those in the above embodiments Further, the battery charging is performed through the electric field coupling system between both the capacitive elements 62, 62A, and hence, in order to transmit electric power, it suffices if a desired capacity is ensured between the capacitive elements 62, 62A, and no specific configurations of the capacitive elements 62, 62A are needed. Furthermore, since currents inflowing into the capacitive elements 62, 62A are as small as on the order of several mA according to the electric field coupling system, the capacitive elements 62, 62A are subjected to less limitations in material and body thickness to thereby permit a higher degree of freedom in incorporating the capacitive elements into the system, enabling a higher transmission efficiency to be obtained, leading to an advantage that its charging time becomes equivalent to a conventional system using connecting wires.

Fourth Embodiment

Figure 11:
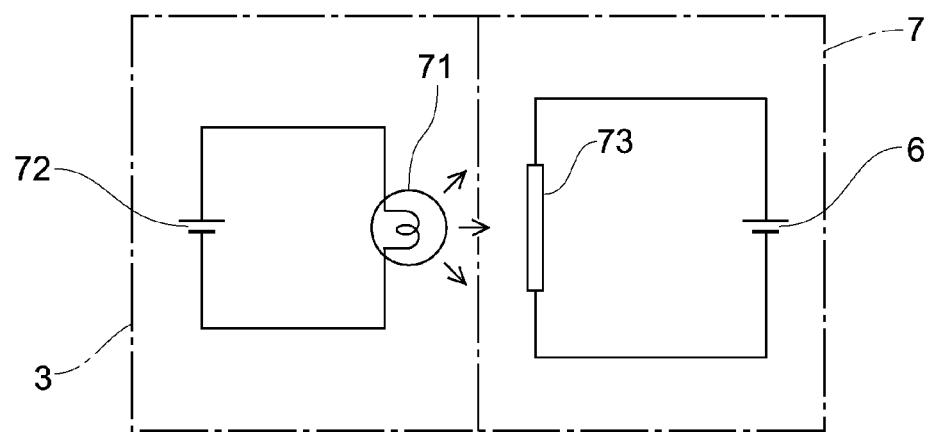
FIG. 11 is an explanatory drawing illustrating a fourth embodiment of the present invention.
Figure 12:
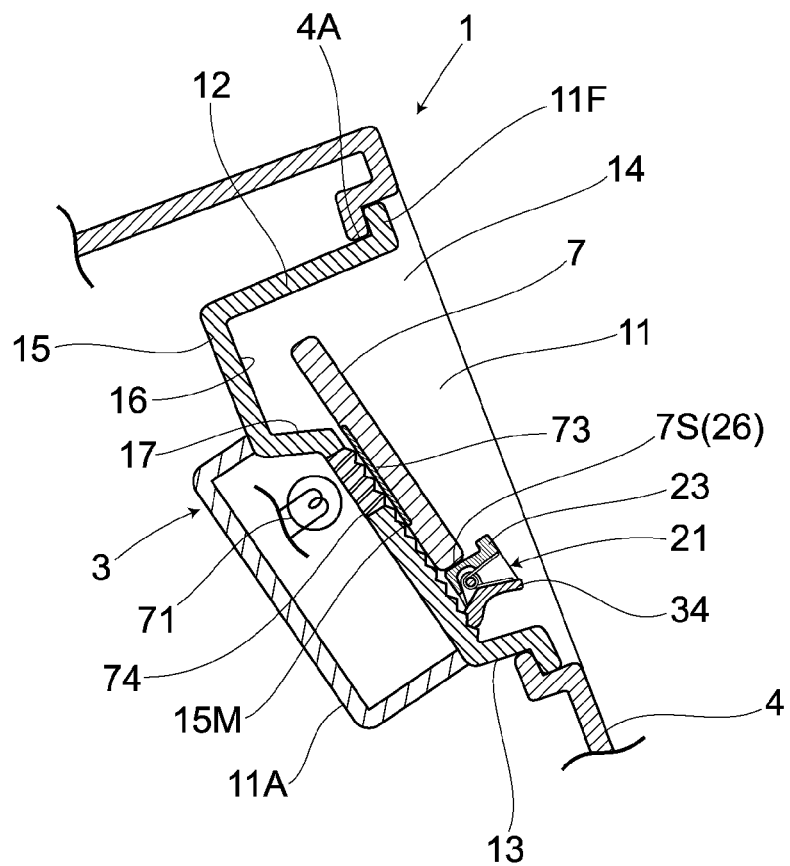
FIG. 12 is an overall perspective view illustrating the fourth embodiment of the present invention.

FIG. 11 and FIG. 12 show a fourth embodiment of the present invention. The same symbols are attached to parts the same as those in each of the above embodiments and the detailed description thereof is omitted, while a feature specific to the fourth embodiment is described in detail hereinbelow. According to the fourth embodiment, there is provided an in-vehicle battery charging system 1 for charging a battery through the photovoltaic effect. As shown in FIG. 11, the battery charger 3 includes a light emitting unit 71 acting as an energy transmitting unit. As an example of this light emitting unit 71, there is proposed an electric bulb or an LED so that the light emitting unit 71 becomes luminous by an in-vehicle rechargeable battery 72 acting as an in-vehicle electric source. On the other hand, a solar battery 73 acting as an energy receiving unit is provided in the object 7 to be charged to charge the rechargeable battery 6 using photovoltaic power of the solar battery 73 that has received light of the light emitting unit 71. Note that the light emitting unit 71 is arranged at the position of the primary coil 2.

In this case, a transparent window 74 made of a transparent material is provided in the mounting surface 15M corresponding to the light emitting unit 71, and the solar battery 73 is provided on the back side of the object 7 to be charged. Alternatively, the transparent window 74 may be replaced by an opening provided in the mounting surface 15M at the position of the light emitting unit 71.

As described above, according to the present embodiment, there is provided the in-vehicle battery charging system 1 comprising the battery charger 3 with the light emitting unit 71 acting as an energy transmitting unit to be used to charge the object 7 to be charged, including the solar battery 73 acting as the energy receiving unit and the rechargeable battery 6. Accordingly, the battery charger 3 and the object 7 to be charged are allowed to come close to each other, thus charging the rechargeable battery 6, using the energy received by the solar battery 73 from the light emitting unit 71, i.e., the energy received by the solar battery 73 through the photovoltaic effect of the solar battery 73. According to the in-vehicle battery charging system 1, the battery charger 3 is provided in the instrumental panel 4 of the vehicle 8 and includes the slider assembly 23 acting as a holding unit for adjusting the position of the solar battery 73 of the object 7 to be charged with respect to the light emitting unit 71 of the battery charger 3. Hence, the in-vehicle battery charging device 1 according to the fourth embodiment achieves the same advantageous operation and effect as those in the above embodiments.

Here, the rechargeable battery 6 may be charged with the light emitting unit 71 being in contact with the solar battery 73. In this case also, the battery charger 3 and the object 7 to be charged need not be connected by an electric cable or the like. Also, the light emitting unit 71 may be utilized for in-car illumination other than for the charging operation.

Fifth Embodiment

Figure 13:
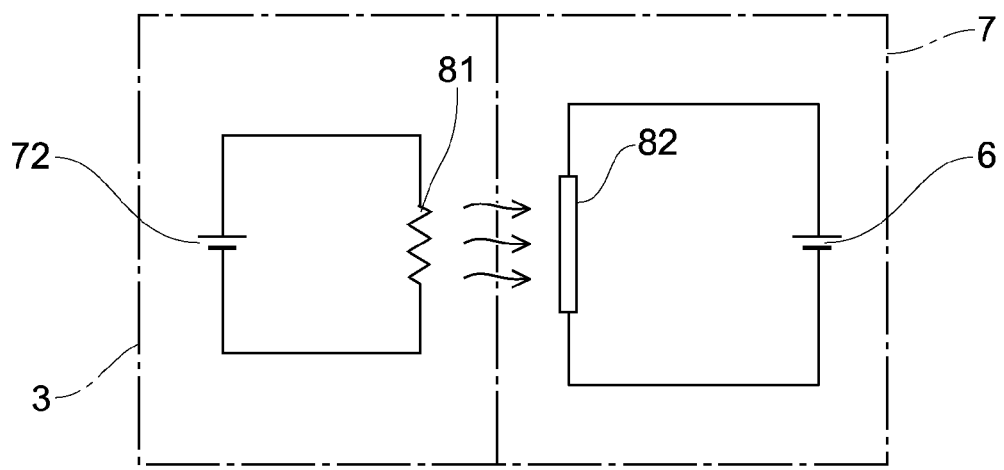
FIG. 13 is an explanatory drawing illustrating a fifth embodiment of the present invention.

FIG. 13 shows a fifth embodiment of the present invention. The same symbols are attached to parts the same as those in each of the above embodiments and the detailed description thereof is omitted, while a feature specific to the fifth embodiment is described in detail hereinbelow. In the present embodiment, there is provided an in-vehicle battery charging system 1 for charging a battery by an electromotive force generated through the Seebeck effect in a thermocouple. As shown in FIG. 13, the battery charger 3 is equipped with a heat generating unit 81 acting as an energy transmitting unit for generating heat by the in-vehicle rechargeable battery 72. As an example of this heat generating unit 81, there is proposed an electric heater, which is desirably a planer heater. On the other hand, the object 7 to be charged is provided with a thermocouple 82 acting as an energy receiving unit to charge the rechargeable battery 6 by the electromotive force generated by the thermocouple 82 upon receiving the heat of the heat generating unit 81. Note that the heat generating unit 81 may be arranged at the position of the primary coil 2 or provided on the mounting surface 15M in an exposed manner. Alternatively, a high thermal conducting member with a higher thermal conductivity than that of the mounting surface 15M may be provided in the mounting surface 15M so that the heat generating unit 81 may be arranged on the rear surface of the high thermal conducting member. In this case, it is desirable that the periphery of the high thermal conducting member is insulated.

As described above, according to the present embodiment, there is provided the in-vehicle battery charging system 1 comprising the battery charger 3 with the heat generating unit 81 acting as the energy transmitting unit to be used to charge the object 7 to be charged including the thermocouple 82 acting as the energy receiving unit and the rechargeable battery 6. Accordingly, the battery charger 3 and the object 7 to be charged are allowed to come close to each other, thus charging the rechargeable battery 6, using the energy received by the thermocouple 82 from the heat generating unit 81, i.e., the energy received by the thermocouple 82 through the thermoelectromotive effect of the thermocouple 82. According to the in-vehicle battery charging system 1, the battery charger 3 is provided in the instrumental panel 4 of the vehicle 8 and includes the slider assembly 23 acting as a holding unit for adjusting the position of the thermocouple 82 of the object 7 to be charged with respect to the heat generating unit 81 of the battery charger 3. Hence, the in-vehicle battery charging system 1 according to the fifth embodiment achieves the same advantageous operation and effect as those in the above embodiments.

Here, the rechargeable battery 6 may be charged with the heat generating unit 81 being in contact with the thermocouple 82. In this case also, the battery charger 3 and the object 7 to be charged need not be connected by an electric cable or the like.

In addition, the present invention is not limited to the foregoing embodiments and various modifications are possible within the scope of the gist of the present invention. For example, in the foregoing embodiments, there is proposed the battery charger transversely mounted with the object 7 to be charged. The present invention, however, is also applicable to ones vertically mounted with the object to be charged. Preferably, the operative unit for fixing and unfixing the positions of the position adjusting unit and holding unit is of a manual type, but other various types may be employed, such as a power-driven one allowing the holding unit to move up and down.

What is claimed:

1. An in-vehicle battery charging system for charging an object including an energy receiving unit and a rechargeable battery, comprising:
   a battery charger with an energy transmitting unit, the battery charger being provided in an instrumental panel of a vehicle and including a mounting surface on which the object to be charged is mounted with a surface of the object contacting the mounting surface, thus charging the rechargeable battery, using an energy received by the energy receiving unit from the energy transmitting unit; and
   a holding unit for adjusting a position of the energy receiving unit of the object to be charged with respect to the energy transmitting unit of the battery charger,
   wherein the mounting surface is tilted forward in a travelling direction of the vehicle, and the holding unit is provided, on the mounting surface, slidably movable along the mounting surface in such a fashion that a vertical position of the holding unit is adjustable,
   wherein a recess is formed in an upper portion of the mounting surface, the recess being formed into a size large enough for an upper portion of the object to be charged to get thereinto when the upper portion of the object is pushed toward the recess such that a lower portion of the object is disengaged from the mounting surface, and
   wherein a housing portion for housing and mounting the object to be charged is provided in a central portion of the instrumental panel of the vehicle, the housing portion being provided with the mounting surface.

2. The in-vehicle battery charging system according to claim 1, further comprising a position adjusting unit for adjusting a position of the object to be charged, wherein the position adjusting unit includes an operative unit for enabling a vertical position of the holding unit to be fixed and unfixed.

3. The in-vehicle battery charging system according to claim 1, wherein the energy transmitting unit is a primary coil and the energy receiving unit is a secondary coil, the primary coil being provided continuously over a substantially entire length of the mounting surface in a traverse direction thereof.

4. The in-vehicle battery charging system according to claim 1, wherein the object to be charged is a mobile terminal with a built-in GPS device, a wireless function and an information display function, while the in-vehicle battery charging system includes a communication unit for transmitting, to the object to be charged, information collected from a travelling condition acquiring sensor mounted on a vehicle.

5. The in-vehicle battery charging system according to claim 1, wherein an angle of the mounting surface to a horizontal plane is 45 degrees or more and 73 degrees or less.

6. An in-vehicle battery charging system for charging an object including an energy receiving unit and a rechargeable battery, comprising:
   a battery charger with an energy transmitting unit, the battery charger being provided in an instrumental panel of a vehicle, thus charging the rechargeable battery, using an energy received by the energy receiving unit from the energy transmitting unit; and
   a holding unit for adjusting a position of the energy receiving unit of the object to be charged with respect to the energy transmitting unit of the battery charger,
   wherein the energy transmitting unit includes a first capacitive element and the energy receiving unit includes a second capacitive element, and an electric power is fed from the energy transmitting unit to the energy receiving unit through an electric field coupling system between the first capacitive element and the second capacitive element.

7. An in-vehicle battery charging system for charging an object including an energy receiving unit and a rechargeable battery, comprising:
   a battery charger with an energy transmitting unit, the battery charger being provided in an instrumental panel of a vehicle, thus charging the rechargeable battery, using an energy received by the energy receiving unit from the energy transmitting unit; and
   a holding unit for adjusting a position of the energy receiving unit of the object to be charged with respect to the energy transmitting unit of the battery charger,
   wherein the energy transmitting unit is a light emitting unit configured to emit a light, and the energy receiving unit is a solar battery configured to receive the emitted light and convert the emitted light to an electricity by using a photovoltaic effect.

8. An in-vehicle battery charging system for charging an object including an energy receiving unit and a rechargeable battery, comprising:
   a battery charger with an energy transmitting unit, the battery charger being provided in an instrumental panel of a vehicle, thus charging the rechargeable battery, using an energy received by the energy receiving unit from the energy transmitting unit; and
   a holding unit for adjusting a position of the energy receiving unit of the object to be charged with respect to the energy transmitting unit of the battery charger,
   wherein the energy transmitting unit is a heat generating unit configured to generate a heat, and the energy receiving unit is a thermocouple configured to receive the generated heat and convert the generated heat to an electricity by using a thermoelectromotive effect.

9. The in-vehicle battery charging system according to claim 8, wherein the battery charger includes a mounting surface on which the object to be charged is mounted and a high thermal conducting member with higher thermal conductivity than that of the mounting surface is provided on the mounting surface, and the heat generating unit is arranged in a rear surface of the high thermal conducting member.

* * * * *